(12) United States Patent
Wang et al.

(10) Patent No.: US 10,505,959 B1
(45) Date of Patent: Dec. 10, 2019

(54) SYSTEM AND METHOD DIRECTED TO BEHAVIORAL PROFILING SERVICES

(71) Applicant: HEWLETT PACKARD ENTERPRISE DEVELOPMENT LP, Houston, TX (US)

(72) Inventors: Jisheng Wang, Belmont, CA (US); Madhusudana Shashanka, Santa Clara, CA (US); Chao Yang, Santa Clara, CA (US); Min-Yi Shen, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 363 days.

(21) Appl. No.: 15/374,496

(22) Filed: Dec. 9, 2016

Related U.S. Application Data (60) Provisional application No. 62/265,924, filed on Dec. 10, 2015.

(51) Int. Cl.
 *H04L 29/06* (2006.01)
 *G06N 20/00* (2019.01)
(52) U.S. Cl.
 CPC ......... *H04L 63/1425* (2013.01); *G06N 20/00* (2019.01)

(58) Field of Classification Search
 USPC .......................................................... 726/23
 See application file for complete search history.

(56) References Cited

U.S. PATENT DOCUMENTS

| 5,740,233 A * | 4/1998 | Cave ....................... H04M 3/22 |
| | | 379/111 |
| 9,609,010 B2 * | 3/2017 | Sipple ................. H04L 63/1425 |
| 2008/0178294 A1 * | 7/2008 | Hu ......................... G06F 21/552 |
| | | 726/24 |
| 2015/0007314 A1 * | 1/2015 | Vaughan ............. H04L 63/1441 |
| | | 726/23 |

\* cited by examiner

*Primary Examiner* — Kambiz Zand
*Assistant Examiner* — Aubrey H Wyszynski
(74) *Attorney, Agent, or Firm* — Sheppart Mullin Richter & Hampton (57) ABSTRACT

A security appliance with one or more processors and a memory communicatively coupled to the one or more processors is described. The memory includes behavior profiling service logic that, when executed by the one or more processors, (i) creates a behavior profile for a particular entity based on received incoming data, and (ii) determines whether the behavior profile identifies that a malicious attack is being performed by the particular entity based on a comparison of the behavior profile to a reference profile. The reference profile represents historical behavior of the particular entity that is monitored over a prescribed period of time.

16 Claims, 7 Drawing Sheets

SYSTEM AND METHOD DIRECTED TO BEHAVIORAL PROFILING SERVICES

CROSS-REFERENCE TO RELATED APPLICATIONS

This application claims the benefit of priority on U.S. Provisional Application No. 62/265,924 filed Dec. 10, 2015, the entire contents of which are incorporated by reference herein.

FIELD

Embodiments of the invention relate to the field of cyber security; and more specifically, behavior profiling services for detection of suspicious behaviors that may be associated with a malicious attack on an enterprise.

BACKGROUND

Over the last few years, the general populous has encountered the proliferation of different cyber security threats, such as the proliferation of malicious software (sometimes referred to as "malware") over the Internet. Malware has many forms including exploits, namely attempts to take advantage of a vulnerability in software that is loaded onto an electronic device in order to adversely influence or attack operations of that electronic device.

There are several techniques known for detecting, analyzing, and responding to global security threats that are initiated by an outside source. Existing security applications may be configured to collect and aggregate potential malicious data from different monitoring points, and thereafter, an analysis is performed on the collected data to determine if the data is malicious. However, conventional security appliances offer limited protection against certain localized security threats that involve voluntary or involuntary attempts in accessing network resources in order to gather or solicit confidential or other sensitive information. For instance, conventional security appliances may be adapted to detect and prevent against data exfiltration threats caused by malware, but these security appliances are not suited in protecting an enterprise against many types of localized threats such as insider attacks (i.e. attacks by employees who have sufficient access privileges to gather or solicit confidential or other sensitive information) or attacks based on pre-existing device infection where the electronic device has already been compromised prior to deployment of these security appliances.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

As described below, behavior profiling may be conducted for a variety of security deployments. Implemented to analyze incoming data received by a data analysis engine (described below), behavior profiling service logic provides an infrastructure that supports different behavior profile use cases. More specifically, as described below, the behavior profiling service logic controls the monitoring and collection of at least a portion of the incoming data associated with selected behavior types in order to create one or more behavior profiles. Each behavior profile may be associated with a particular behavior type and a particular entity (e.g., device, user, group, etc.).

As an illustrative example, one behavior type corresponds to "access behaviors," namely behaviors defined by time-based and/or location-based activities (also referred to as "features") associated with for the particular entity. A "time-based feature" may include information that is directed to an access for data (by an entity being profiled) from a monitored network resource, when the access is conducted by an entity and is performed within a prescribed period of time. A "location-based feature" may include information that identifies a location of an entity conducting the monitored activities. Besides access behaviors, another behavior type corresponds to "data transfer behaviors," which include features directed to a data transfer (e.g., total size of all uploading/downloading sessions, average size of each uploading/downloading session, etc.).

Herein, according to one illustrative embodiment, the behavior profiling service logic features (i) behavior profile generation logic, (ii) reference profile generation logic, and (iii) behavior profiling and reporting logic. In general, the behavior profile generation logic is configured to monitor and collect specific information associated with particular behavior(s) of an entity being monitored (sometimes referred to as a "profiled entity"), and thereafter, generate a behavior profile based on the collected information. The behavior profile includes content associated with a plurality of features that represent a particular behavior that is monitored (e.g., access behavior, data transfer behavior, etc.), where the behavior profile may be analyzed to determine whether an insider attack is being conducted by the profiled entity. The profiled entity may be a particular electronic device, a particular user, a particular user group, or a particular network resource or network resources. The reference profile generation logic operates in a similar manner.

The behavior profiling and reporting logic is configured to conduct a comparison between (i) content associated with each of the plurality of features that collectively form a behavior profile, where the content associated with the features may be gathered during a first prescribed period of time, and (ii) content associated with corresponding features of one or more reference profiles produced by the reference profile generation logic. According to one embodiment of the disclosure, the "reference profile" represents the historical behavior of a profiled entity that is monitored over a second prescribed period of time. The reference profile is used as a reference for analysis purposes in order to detect an abnormal change in behavior by the profiled entity. Hence, the behavior profiling service logic is available directly as a tool or service that provides additional security measures, most notably a mechanism to detect insider attacks by comparison of current (monitored) behaviors to expected (heuristic) behaviors.

References in the specification to "one embodiment" or "an embodiment," may indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that such feature, structure, or characteristic may be deployed in connection with other embodiments whether or not explicitly described.

In the following description, certain terminology is used to describe features of the invention. For example, in certain situations, the terms "engine", "logic," "component" and "sensor" are representative of hardware, firmware and/or software that is configured to perform one or more functions. For instance, as hardware, an engine (or logic, component or sensor) may include circuitry having data processing and/or data capturing functionality combined with data transmission and/or storage functionality. An engine (or logic, component or sensor) may include a processor (e.g., digital signal processor, microprocessor with one or more processor cores, a programmable gate array, a microcontroller, an application specific integrated circuit, etc.), semiconductor memory, and/or wireless or wired transmitter and/or transceiver circuitry.

Alternatively, the engine (or logic, component or sensor) may be software in the form of one or more software modules, such as code in the form of an executable application, an application programming interface (API), a routine or subroutine, a script, a procedure, an applet, a servlet, source code, object code, a shared library/dynamic link library, or one or more instructions. The software module(s) may be stored in any type of a suitable non-transitory storage medium, or a transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "eflow" generally refers to a series of related packets. According to one embodiment, a start of the series of related packets may include a 5-tuple that includes at least a Source Address, Destination Address, and length. In transit or at rest, this series of related packets may include one of more objects, namely a subset of the related packets that collectively form either an executable that is packed or a non-executable such as a dynamically link library (DLL), a Portable Document Format (PDF) file, a JavaScript® file, Zip® file, a Flash® file, a document (for example, a Microsoft® Office® document, Word® document, etc.), an electronic mail (email), downloaded web page, a text message, or the like. A "packet" generally refers to any information transmitted in a prescribed format.

The term "transmission medium" is a physical or logical communication path between two or more network devices. One type of electronic device is a "network device" operating as an endpoint device with data processing and network connectivity (e.g., a server, a mainframe, a firewall, intermediary devices such as a router, a switch or a bridge) or a client device (e.g., a desktop or laptop computer, netbook, tablet, smart phone, set top box, wearable computing device, or a video game console). For instance, the communication path may include wired and/or wireless segments, shared memory locations or some sort of interprocess communications. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the term "match" generally describes that a certain level of comparison that has been successfully achieved. The level of comparison may be less than an identical comparison, as the level of comparison may be guided by the customer based on a level of tolerance of false positives and/or false negatives in detection of suspicious behavior.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

I. General Architecture

Figure 1:
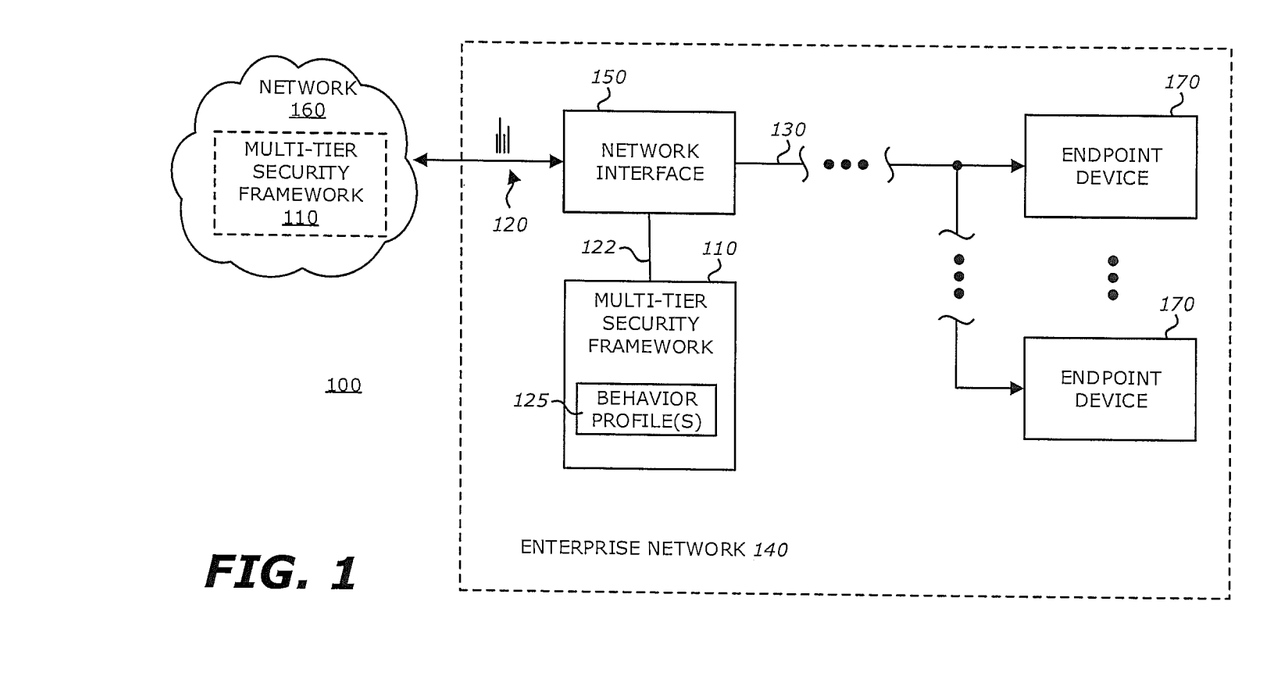
FIG. 1 illustrates an embodiment of a communication system deploying a multi-tier security framework.

Referring to FIG. 1, an exemplary block diagram of a communication system 100 featuring a multi-tier security framework 110 is shown. The security framework 110 detects suspicious access behavior and/or data transfer behavior based on behavior profiling. "Behavior profiling" generally relates to (1) monitoring the incoming data 120 for data 122 associated with selected features that define one or more behaviors; (2) creating a behavior profile 125 based on content that includes data 122 or is representative of the data 122; and (3) analyzing the behavior profile 125 to determine whether a particular behavior is "suspicious," namely the particular behavior exceeds a prescribed level of dissimilarity with a reference profile (sometimes referred to as a "profile baseline") so as to denote that the particular behavior suggests a malicious attack may be occurring. According to one embodiment of the disclosure, the prescribed dissimilarity level corresponds to an amount of change between the monitored behavior of an entity and the expected behavior as measured over a prolonged period of time. If the monitored behavior is deemed suspicious, an alert may be generated to signal a user or an administrator that more in-depth analyses should be conducted to determine whether the particular behavior is part of an insider (malicious) attack.

According to this embodiment of the disclosure, the incoming data 120 corresponds to network traffic may be routed over transmission medium 130 forming an enterprise network 140. Herein, the security framework 110 is communicatively coupled with the transmission medium 130 via a network interface 150. In general, the network interface 150 operates as a data capturing device (sometimes referred to as a "network tap") that is configured to receive the incoming data 120 propagating to/from one or more endpoint devices 170 and provide at least some of incoming data (data 122) to the security framework 110. For instance, the data 122 may include a series of packets or certain content within the packets (e.g., part of the packet header field(s), part of the packet payload(s), etc.). Of course, data 122 from the network interface 150 may be duplicative of a part of the incoming data 120 (or even outgoing data) originally detected during propagation to (or from) the targeted endpoint device 170.

Alternatively, although not shown, the security framework 110 may be positioned in-line with the targeted endpoint device 170 without the network interface 150. Hence, the security framework 110 may be deployed as part of an intermediary device within the enterprise network 140. As another alternative, as represented by dashed lines, the security framework 110 may be provided as cloud services accessible via communication network 160. The communication network 160 may include a public network such as the Internet, in which case one or more security appliances, such as a firewall for example, are positioned to receive and process network traffic prior to receipt of the network traffic by logic within the security framework 110. Alternatively, the communication network 160 may be a private network such as a wireless data telecommunication network, wide area network (WAN), a type of local area network (LAN), or a combination of networks.

As shown in FIG. 1, the incoming data 120, which is used in part to formulate the behavior profile 125, is based on network traffic. It is contemplated, however, that other types of data may operate as the incoming data 120. For example, additionally or in the alternative, the incoming data 120 may be based on log information, flow records (e.g., OSI Layer 4 "L4" information regarding communications monitored by other network devices), and host telemetry information (e.g., information from endpoint devices 170), as described below.

Although FIG. 1 illustrates the multi-tier security framework 110 within the enterprise network 140, in some embodiments, the multi-tier security framework 110 is at least partially located outside the enterprise network 140. For example, at least some of the functions of the multi-tier security framework 110 may be performed over a different type of network (e.g., in the "cloud" over the Internet or other WAN).

Figure 2A:
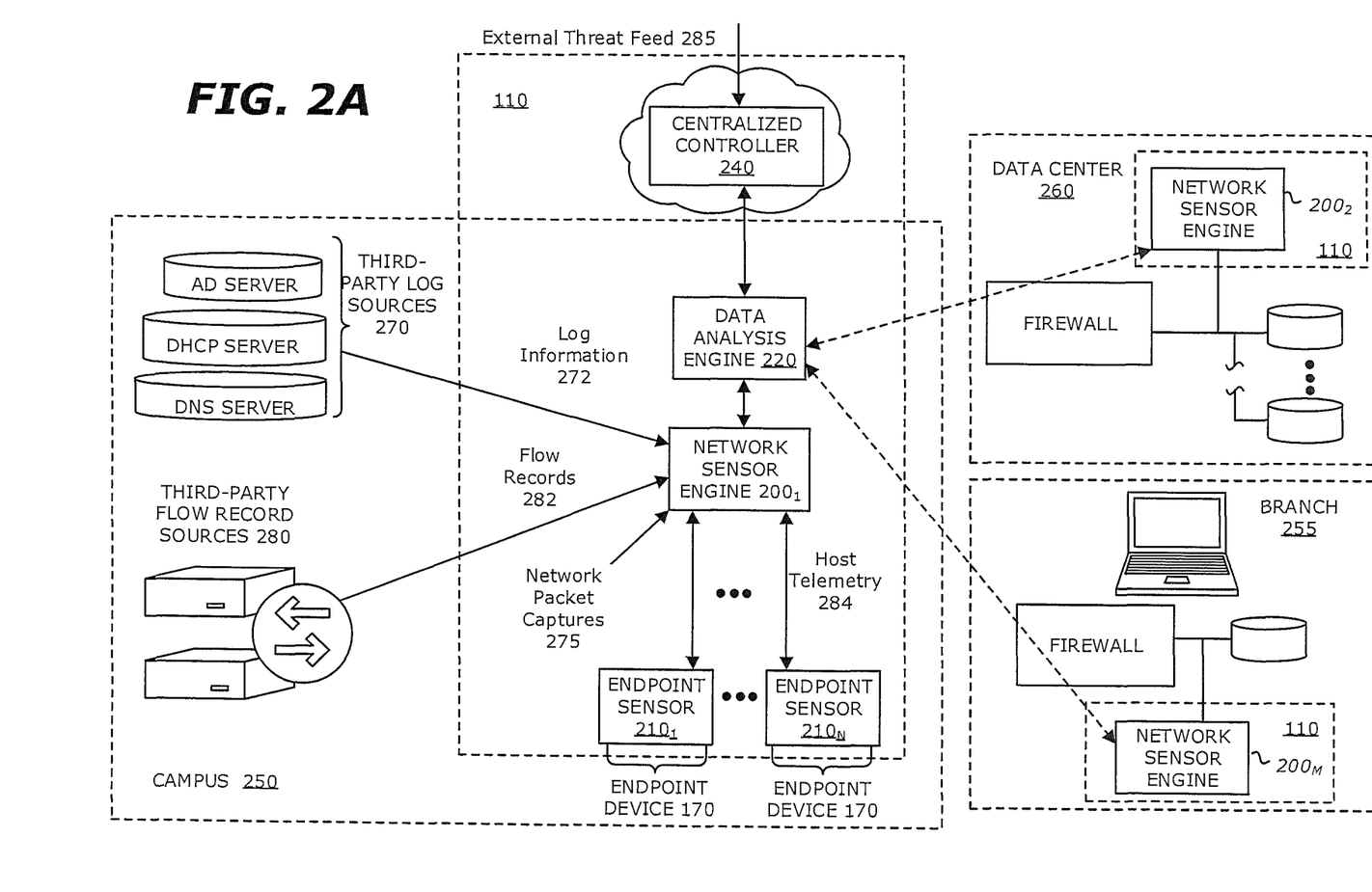
FIG. 2A illustrates an embodiment of the security framework of FIG. 1.
Figure 2B:
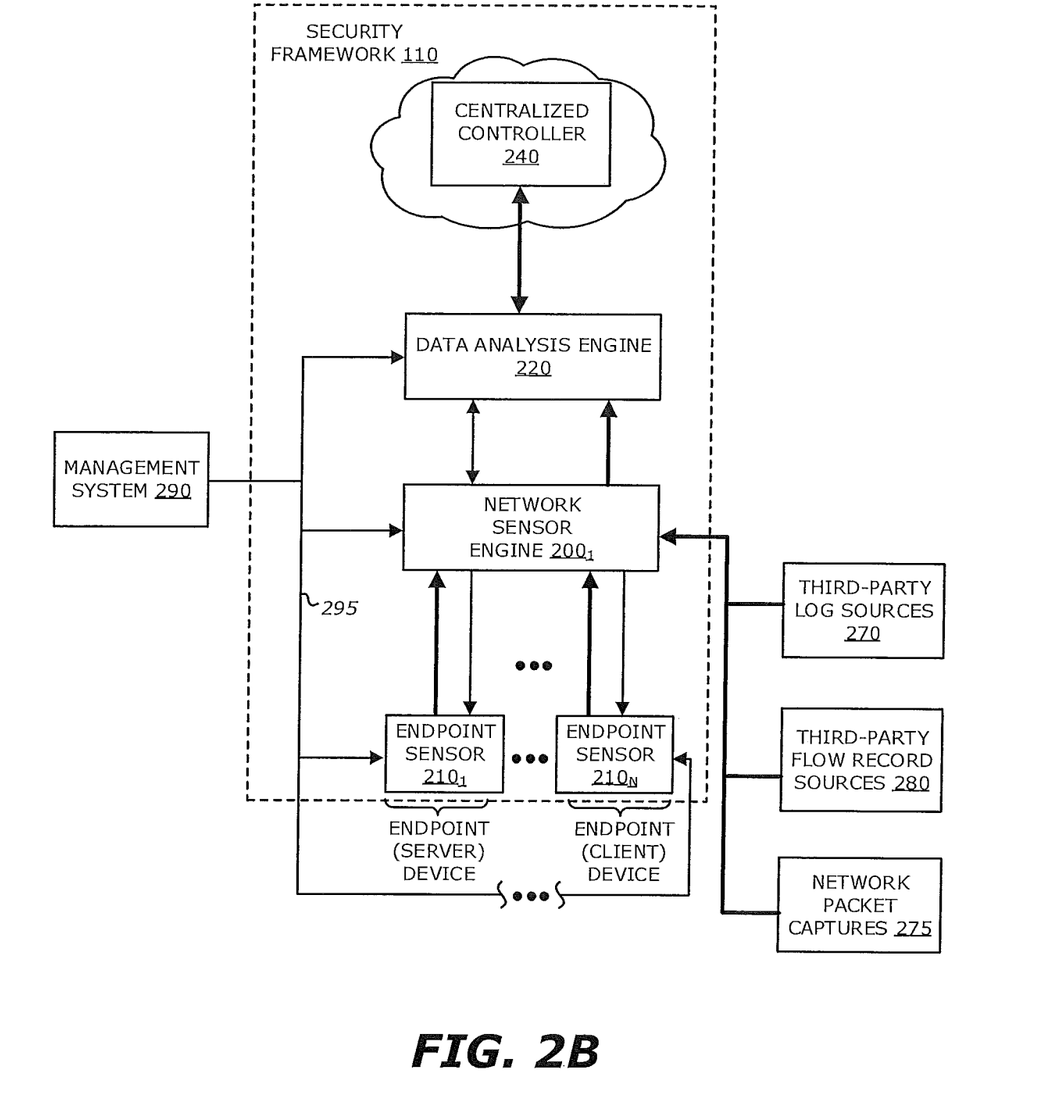
FIG. 2B illustrates an embodiment of the interoperability of a management system and the security framework of FIG. 1.

According to one embodiment of the disclosure, as illustrated in FIGS. 2A and 2B, the security framework 110 comprises one or more network sensor engines $200_1$-$200_M$ (M≥1), a data analysis engine 220 and a centralized controller 240. Deployed at various locations within the enterprise network 140 of FIG. 1 (e.g., campus 250, branch 255, or data center 260 as shown in FIG. 2A), each of the one or more network sensor engines (also referred to as "network sensor engine(s)") $200_1$-$200_M$ may be configured to receive, process and/or store (i) information associated with monitored incoming packets that form network traffic, including extracted objects (e.g., files) (e.g., network packet captures 275, sometimes referred to as "eflows," are received from the network interface 150 or other devices on the network such as receipt through a SPAN port); (ii) log information 272 from different network devices (e.g., third-party log sources 270 such as Active Directory® server logs, Domain Name System "DNS" server logs, Dynamic Host Configuration Protocol "DHCP" server logs, etc.); (iii) flow records 282 from third-party flow record sources 280; and (iv) host telemetry information 284 from one or more endpoint devices 170 (e.g. client devices and/or servers).

More specifically, the network sensor engine(s) $200_1$-$200_M$ include at least a first network sensor engine $200_1$ that is adapted to communicate with one or more endpoint sensors $210_1$-$210_N$ (N≥1), which collect and/or store the host telemetry information 284 associated with the endpoint devices 170 (e.g., client devices and/or servers). These endpoint sensor(s) $210_1$-$210_N$ may be configured as lightweight software sensors deployed on or coupled to endpoint devices 170 (e.g., client devices, and/or servers) that are connected to the enterprise network 140 of FIG. 1. The endpoint sensor(s) $210_1$-$210_N$ are adapted to gather information associated with selected behaviors (e.g., access behaviors, data transfer behaviors, etc.) associated with one or more endpoint devices 170 (as well as their corresponding users) for subsequent delivery to data analysis engine 220.

There may be different endpoint sensors deployed for different devices (e.g., an endpoint sensor for a server endpoint device may be configured to gather different information than an endpoint sensor for a client endpoint device). By way of a specific example, where one endpoint device 170 is a server, the host telemetry information 284 may include an access log that indicate a history of active network connections to the server (e.g., total number over a prescribed period of time, what endpoint devices accesses the server and when, etc.), exfiltration data (e.g., file name, file path, access date/time, etc. of data downloaded from the server), or the like.

Furthermore, the first network sensor engine $200_1$ is adapted to receive network packets propagating to/from one or more devices in the network through the network interface 150 (e.g., information to/from the endpoint devices 170 or other network devices). In some embodiments, the first network sensor engine $200_1$ is adapted to extract or generate metadata from the network packets. Also, the first network sensor engine $200_1$ is adapted to receive log information 272 from one or more remotely located servers (e.g., Active Directory® server, DNS server, DHCP server, etc.) that may form part of the enterprise network 140 or operate in concert with network devices within the enterprise network 140. Herein, the log information 272 may include information pertaining to events that have been recorded during communications between the remotely located servers and various endpoint devices.

As an example, the first network sensor engine $200_1$ may be adapted to receive log information 272 from any of the third-party log sources 270 such as an Active Directory® server, which enables the first network sensor engine $200_1$ to generate a user/Internet Protocol (IP) address mapping. Since IP addresses are dynamic (re-assigned) and the security framework 110 is capable of storing data for a prolonged time period, the user/IP address mapping enables the first network sensor engine $200_1$ to determine user activity (and her corresponding endpoint device) despite IP address changes.

Besides log information 272, the first network sensor engine $200_1$ may be adapted to communicate and receive flow records 282 (e.g., netflow records, sflow records, jflow records, etc.) from third-party flow record sources 280, namely information associated with communications received and/or monitored by other networks devices within the enterprise network 140 (e.g., IP address(es), port number(s), transport type, statistics concerning the network connection, etc.). In combination with the log information 272, network packet captures 275 and log information 284, flow records 282 allow the data analysis engine 220 to formulate behavior profiles, which may be used to detect suspicious behaviors by a user via an endpoint device (e.g., client device) for example.

Normally positioned to reside within the enterprise network 140 of the particular customer, as shown in FIGS. 2A and 2B, the data analysis engine 220 is communicatively coupled to the network sensor engines $200_1$-$200_M$ and receives input data from each of the network sensor engines $200_1$-$200_M$, referred to as "network sensor data". The network sensor data may include metadata and/or other information from the network sensor engines $200_1$-$200_M$ (e.g., gathered information as raw logs, raw flow records, raw packet captures, raw host telemetry information). As an illustrative example, in response to HTTP traffic received by an endpoint device 170 that is monitored by endpoint sensor $210_1$, the first network sensor engine $200_1$ receives network sensor data (raw data) and provides the network sensor data to the data analysis engine 220 to produce one or more behavior profiles, which are used in monitoring for insider attacks. Herein, the raw data may include, but is not limited or restricted to attributes within HTTP messages, including Host names, Uniform Resource Indicator (URI) or Unifoim Resource Locator (URL), User-Agent, Mime-type, Method, Version, Cookie, Filename, Character set (Charset) or the like.

Although the data analysis engine 220 is illustrated in FIGS. 2A-2B as being deployed within the enterprise network 140 of a particular customer, the data analysis engine 220 may be deployed in a private cloud or in a public cloud. Herein, the data analysis engine 220 is adapted to at least (i) provide Application Programming Interface (API) access for receipt of the network sensor data, (ii) conduct analytics on the network sensor data (and perhaps data from the centralized controller 240) to generate behavior profiles, (iii) transmit alerts and perhaps a portion of the network sensor data to the centralized controller 240, and (iv) refine local behavior profiling based on the network sensor data. According to one embodiment of the disclosure, the analytics may be directed to behavioral profiling that is used to determine if any access behaviors and/or data transfer behaviors by a profiled entity correspond to suspicious behavior that warrants further analysis to determine if an insider attack is in process. The local behavior profiling is considered to be "refined" by using the network sensor data to update the reference profile on a periodic or aperiodic basis.

The data analysis engines of different customers are communicatively coupled to the centralized controller 240 and transmit information to the centralized controller 240. The information transmitted from the data analysis engines to the centralized controller 240 may be less information or different information than that transmitted from the network sensor engine(s) to the data analysis engine(s).

Although not illustrated in FIG. 2A, it should be understood that the network sensor engines of branch 255 and data center 260 may each receive host telemetry information from endpoint sensor(s), network packet captures from packet capture device(s), third-party flow record information from third party flow record sources, and/or log information from third-party log sources.

Normally positioned outside the enterprise network 140 for communicative coupling to multiple data analysis engines associated with different customers, such as the data analysis engine 220, the centralized controller 240 facilitates automated collective intelligence by leveraging analytics from a specific customer deployment across an entire population of customers. Furthermore, the centralized controller 240 facilitates community-based collective intelligence by allowing customers to share and leverage security intelligence amongst each other. Also, the centralized controller 240 acts as an intermediary between the components of the security framework 110 and third party services such as external threat feeds 285 and enables security personnel to push threat intelligence to all customer deployments. The centralized controller 240 may be deployed in a private cloud or in a public cloud (e.g., accessed over the Internet).

The external threat feeds 285 may include blacklisted domains, blacklisted IP addresses, blacklisted filenames and/or file hashes; as well as metadata related to that blacklisted data (e.g., threat types, botnet types, first-seen timestamp, last-seen timestamp, URI, etc.). The external threat feeds 285 can be used for customer threat reporting and/or with other data when generating the global threat intelligence.

While the data analysis engine 220 provides a local threat intelligence, the centralized controller 240 provides global threat intelligence that aggregates and combines different input described above to build different data analytics models to address sophisticated global threats along different dimensions including domain, IP address, user-agent, filename, etc.

Referring to FIG. 2B, in order to provide unified management of the security framework 110, a management system 290 may be communicatively coupled and provide control information 295 to the endpoint sensor(s) $210_1$-$210_N$, network sensor engines $200_1$-$200_M$, and/or data analysis engine 220. Herein, according to one embodiment of the disclosure, the management system 290 may be responsible for provisioning, monitoring operability and overall management of the endpoint sensor(s) $210_1$-$210_N$, the network sensor engines $200_1$-$200_M$, and/or the data analysis engine 220. For instance, the provisioning may include conducting and managing software upgrades in order to increase the speed of operation or modify attributes relied upon in the generation of the behavior profile or the reference profile. Likewise, monitoring operability may include performing, in a periodic or aperiodic manner, health checks of the endpoint sensor(s) $210_1$-$210_N$, network sensor engines $200_1$-$200_M$ and/or data analysis engine 220; and/or collecting log information and performance data.

Figure 3:
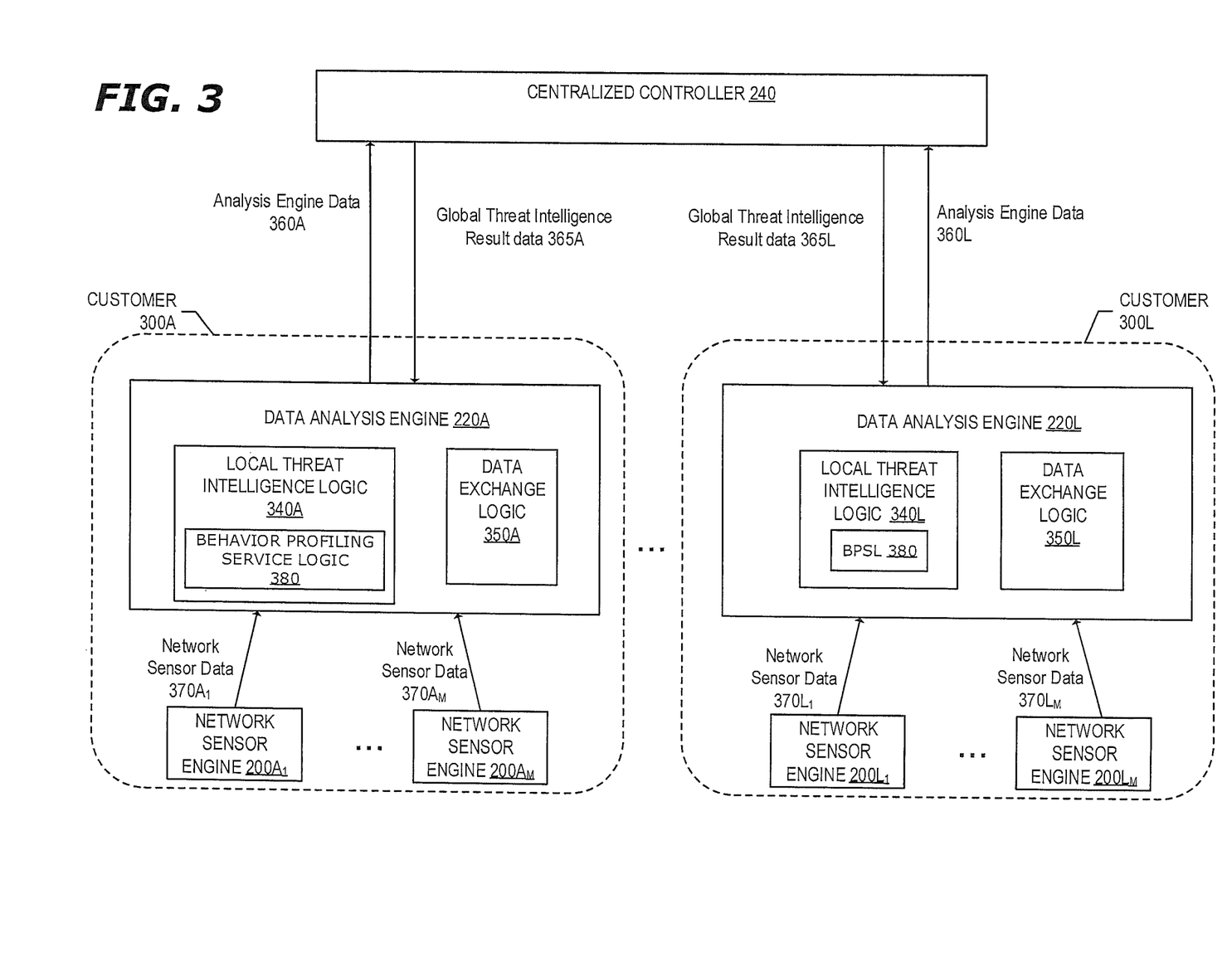
FIG. 3 illustrates a more detailed embodiment of logic deployed within the data analysis engine of FIGS. 2A-2B including the behavior profiling service logic.

FIG. 3 illustrates more detail of the functionality of the security framework 110 according to one embodiment. As previously described, the centralized controller 240 provides global threat intelligence for multiple customers while the data analysis engines 220A-220L are coupled to the centralized controller 240 and provide local intelligence. The data analysis engine 220A is coupled with one or more network sensor engines $200A_1$-$200A_M$ (M≥1) and the data analysis engine 220L is coupled with one or more network sensor engines $200L_1$-$200L_M$ (M≥1). The network sensor engines 200 receive/process input information and generate metadata as previously described herein. The network sensor engines $200A_1$-$200A_M$ (M≥1) transmit the network sensor data $370A_1$-$370A_M$ respectively to the data analysis engine 220A and the network sensor engines $200L_1$-$200L_M$ (M≥1) transmit the network sensor data $370L_1$-$370L_M$ respectively to the data analysis engine 220L.

As stated above, each data analysis engine 220A-220L (e.g., data analysis engine 220A) receives and stores data sent from the respectively connected network sensor engine $200A_1$-$200A_M$ and is configured to (i) provide Application Programming Interface (API) access for receipt of the network sensor data, (ii) conduct analytics on the network sensor data (and perhaps data from the centralized controller 240) to generate behavior profiles, (iii) transmit alerts and perhaps a portion of the network sensor data to the centralized controller 240, and (iv) refine local behavior profiling based on the network sensor data.

As illustrated in FIG. 3, data analysis engine 220A includes at least a local threat intelligence logic 340A and data exchange logic 350A. Herein, data exchange logic 350A collects the data received from the network sensor engine(s) $200A_1$-$200A_M$, optionally tokenizes or anonymizes the data, and transmits at least a portion of the data to the centralized controller 240 for facilitating global threat intelligence. The data transmitted to the centralized controller 240 is referred to as analysis engine data 360A. The data transmitted may also include data generated by the data analysis engine 220A such as intermediate results from the behavior profiling. The analysis engine data 360A may include metadata from known bad flows or users or metadata from all flows or users. The analysis engine data 360A may include an alert that identifies, after behavior profiling, a confidence level (score) to identify that the behavior for a particular user or device is suspicious, a severity of such behavior, and the type of suspicious behavior (e.g., internal collection or exfiltration).

By way of a specific example, based on behavior profiling, if a certain user (or electronic device) is performing behaviors that are not consistent with his or her expected behaviors, which are maintained through machine learning and heuristics, the behavior of the user (or machine) may be deemed "suspicious". This alert may signal that the behaviors of the user (or machine) undergo more in-depth review to determine whether the enterprise is subject to a malicious (insider) attack by the user (or device). For instance, where the user is accessing files and servers that are normally outside his or her usual tasks or is accessing the enterprise network and network resources at unusual (non-work) hours, such findings may arise to a level that the behavior is suspicious, perhaps depending on the frequency of such accesses, the particular files, servers or network resources being accessed, the amount of time difference from work hours to the access time, or the like.

The local threat intelligence logic 340A receives and caches information from the centralized controller 240 and also manages refining local threat intelligence through behavior profiling service logic 380. The behavior profiling service logic 380 is configured to generate reference profiles during a training period, where the reference profiles are based on information from one or more data sources and pertaining to one or more selected entities. Furthermore, the behavior profiling service logic 380 is configured to receive the network sensor data 370A, and based on this data and/or data received from the centralized controller 240, (i) generate behavior profiles for the one or more selected profiled entities and (ii) analyze the behavior profiles to determine whether such behavior by any profiled entity is suspicious.

For example, the data analysis engine 220A may include a number of reference profiles, which may include historical behavior by the profiled entity based on information collected through machine learning. A "reference profile" may be generated during a training period for the behavior profiling service logic 380 in which information received and/or derived from the network sensor engines $200A_1$-$200A_M$ is used to create the reference profile. Thereafter, the reference profile may be updated, in a periodic or aperiodic manner, so that the reference profile represents historical behaviors with temporal proximity to a current time of analysis. Stated differently, the behavior profiling service logic 380 may periodically and aperiodically cause these reference profiles to be retrained.

It is contemplated that result data 365A received from the centralized controller 240 may also be used to refine the reference profiles produced by the behavior profiling service logic 380. The result data 365A may include data received from the different data analysis engines (e.g., data analysis engine 220L) that may pertain to behaviors associated with one of its profiled entities. The result data 365A may further include a blacklist of known threats (e.g., domains, IP addresses, filenames, file hashes, etc.) or other information that may pertain to a feature of a behavior file or cause a feature set of a behavior profile to be altered.

II. Behavioral Profiling—Behavior Profiling Service Logic

Figure 4:
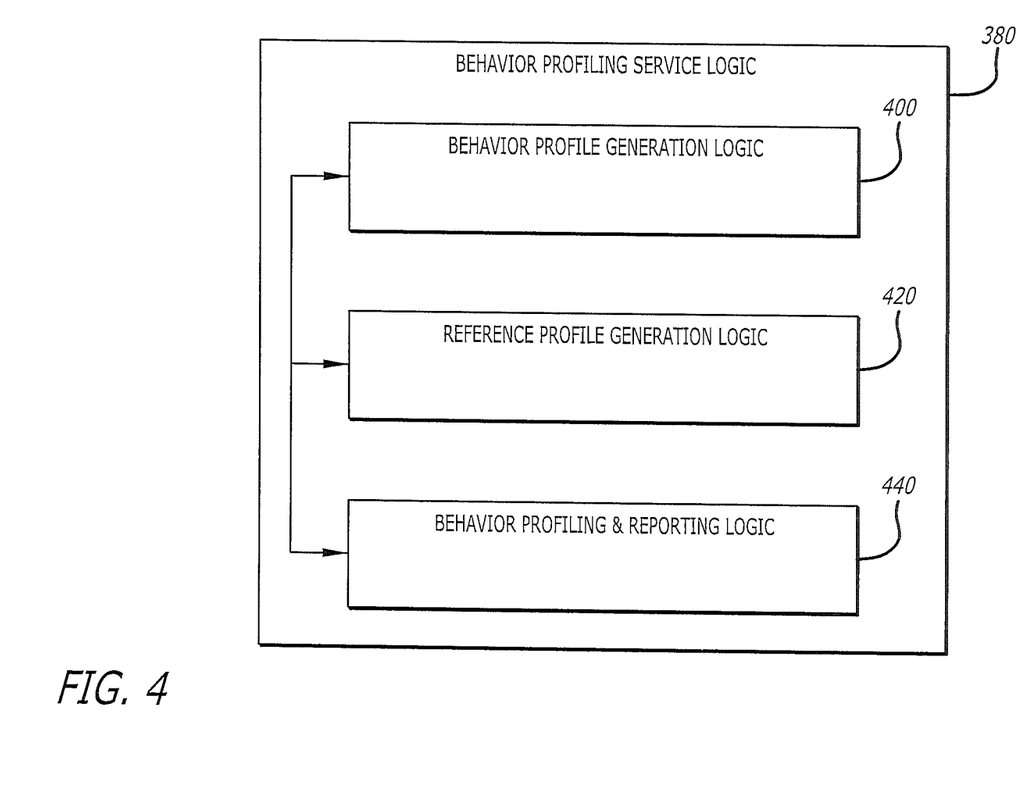
FIG. 4 illustrates an embodiment of logic that is part the behavior profiling service logic of FIG. 3.
Figure 6:
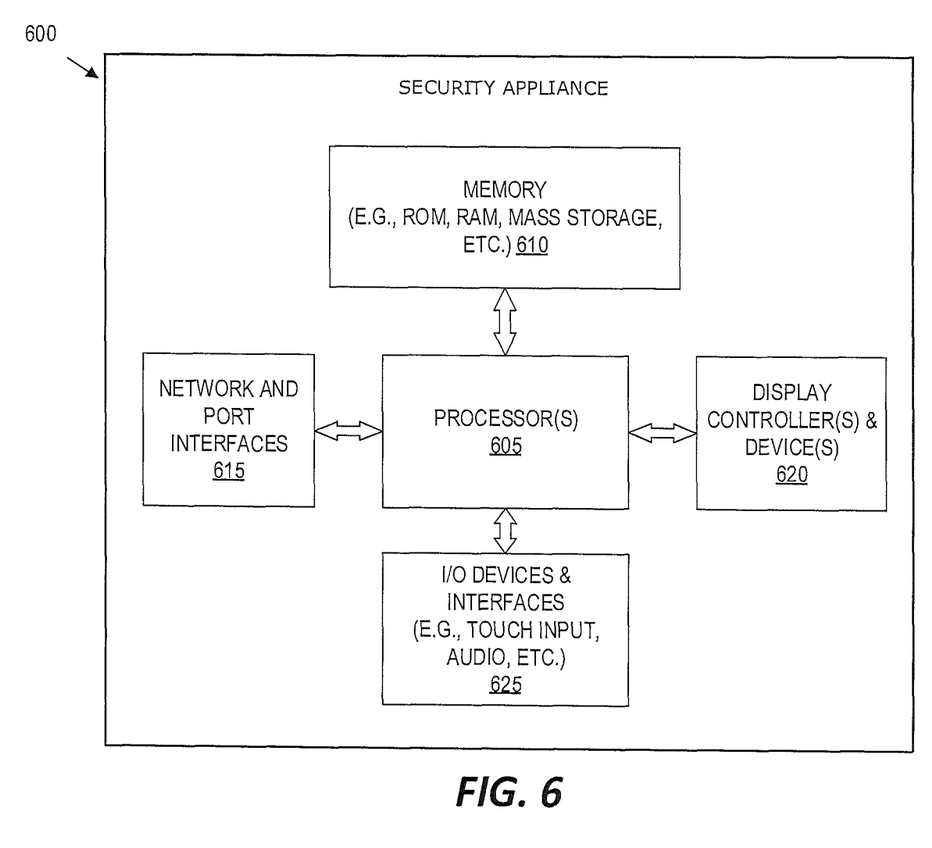
FIG. 6 illustrates a block diagram of an exemplary security appliance that may be used in some embodiments.

Referring now to FIG. 4, an illustrative embodiment of the behavior profiling service logic 380 of FIG. 3 is shown. The behavior profiling service logic 380 features behavior profile generation logic 400, reference profile generation logic 420, and behavior profiling and reporting logic 440, each may be configured as software that is stored in a non-transitory storage medium (memory) processed by at least one hardware processor as illustrated in FIG. 6. Alternatively, the logic 400, 420 and 440 may be deployed as hardware or a combination of hardware/software.

In general, the behavior profile generation logic 400 is configured to generate one or more behavior profiles from incoming data (e.g., network sensor data $370A_1$ of FIG. 3, result data 365A of FIG. 3, etc.). Each behavior profile may be generated based, at least in part, on a plurality of attributes. Examples of these attributes include, but are not limited or restricted to the following: (1) the data source (monitored source of at least a portion of the incoming data); (2) data filters (particular data type(s) collected from the portion of incoming data); and (3) the entity whose activities are being monitored (referred to as the "profiled entity"). The "profiled entity" may include a particular network device, a particular user, a particular user group, or a particular server or group of servers.

According to one embodiment, during installation of the behavior profiling service logic 380, the particulars for these attributes may be selected. For instance, eflows (captured network packets) may be selected as the data source while a particular IP address or hostname supported by the enterprise network may be selected as the data filter. A particular electronic device, as represented by its source IP address, host name or Media Access Control (MAC) address, may be selected as the profiled entity to which analysis is directed. After installation of the behavior profiling service logic 380, it is contemplated that the attributes can be altered to allow an administrator to dynamically "tune" its functionality.

Referring still to FIG. 4, the reference profile generation logic 420 is configured to produce, during a prescribed training period (e.g., 1-2 weeks), one or more reference profiles. Each reference profile includes one or more observed behaviors and is used as a baseline for what activities the entity being monitored should be experiencing. Hence, the reference profiles serve as expected behavior by a profiled entity, where the expected behavior may be directed to data access activities (access behavior) or data transfer activities (data transfer behavior) by a particular profiled entity (e.g., network device, user, user group, server or server group).

The reference profile is used as a profile baseline by the behavior profiling and reporting logic 440 to determine if any monitored activities by the profiled entity, alone or collectively, denote anomalous behavior. "Anomalous behavior" may be determined when the monitored activities differ from the activities associated with expected behavior and the degree of difference is greater than a prescribed level. As an illustrative example, an employee in an engineering group accesses a Human Relations (HR) server that she normally does not access. In behavior profiling by the behavior profiling service logic 380, this activity may represent anomalous behavior, but a single access may not cause the behavior profiling and reporting logic 440 to determine that the access constitutes a "suspicious" behavior by the employee. However, where the employee accesses the HR server repeatedly, perhaps coupled with such accesses occurring after normal business hours, the anomalous behavior may denote suspicious behavior by the employee.

Figure 5:
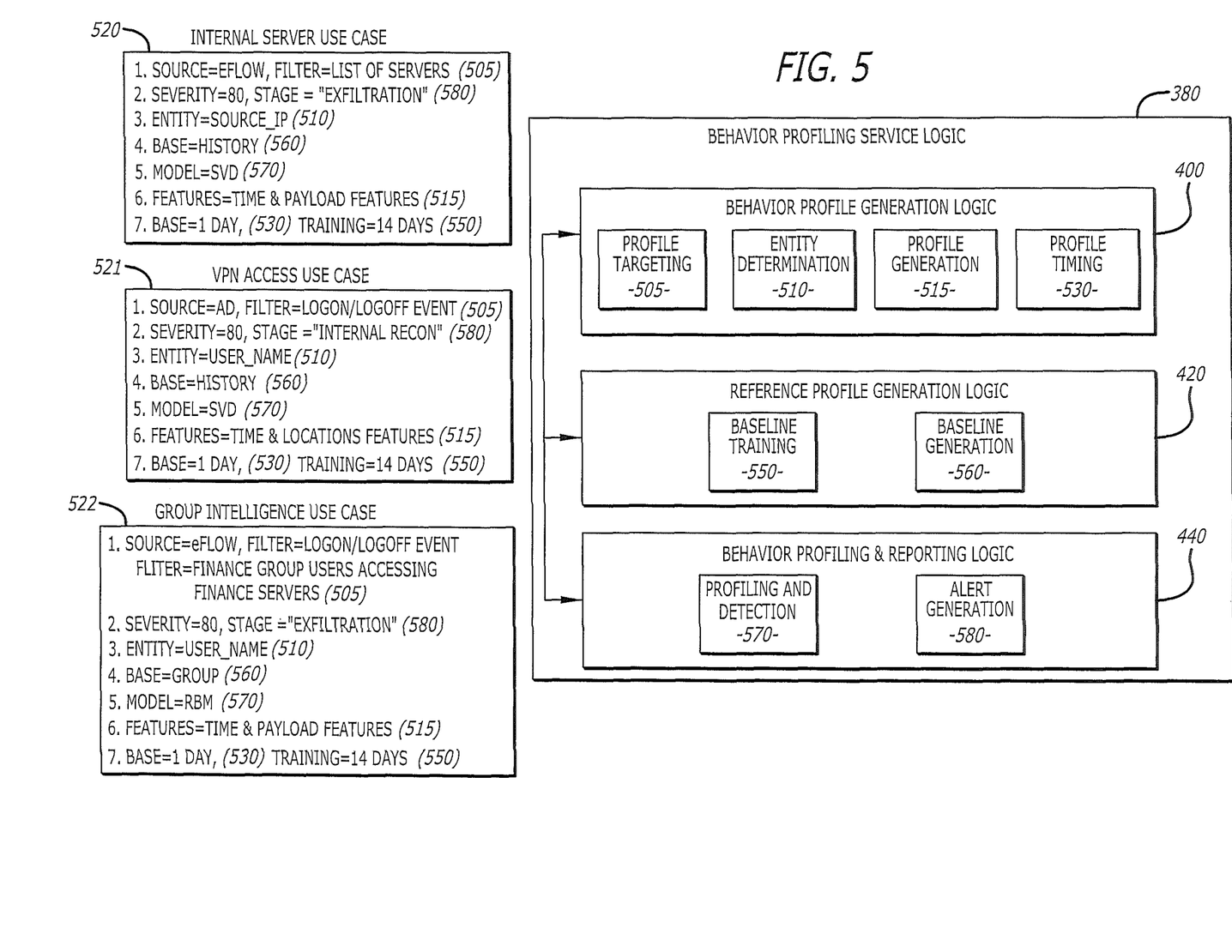
FIG. 5 illustrates an embodiment of components deployed within prescribed logic that is part of the behavior profiling service logic of FIG. 3.

Referring now to FIG. 5, an exemplary embodiment of the components of the behavior profile generation logic 400, the reference profile generation logic 420 and the behavior profiling and reporting logic 440 of the behavior profiling service logic 380 is shown and the operability of these components is discussed.

A. Profile Generation Logic

Herein, the behavior profile generation logic 400 features a profile targeting component 505, an entity determination component 510, a profile generation component 515, and a profiling timing component 530. The profile targeting component 505 is responsible for selecting particular network sensor data to be used in the behavior profiling. More specifically, the profile targeting component 505 includes logic that may be configured to select (i) one or more data sources whose access and/or functionality is to be monitored and (ii) one or more filters that is used to restrict what network sensor data provided from a selected data source(s) is to be monitored. For instance, the profile targeting component 505 may be configured to monitor and collect selected network sensor data (e.g., eflows 275, log information 272, etc.) from difference data sources (e.g., specific port adapted to receive network traffic, third party log source 270). The selection of the data source(s) and filter(s) may be based, at least in part, on the level of priority associated with each data source by a customer. As the priority level may be customer specific, the data source(s) and/or filter(s) may be selected by the customer and updated accordingly.

For instance, in accordance with a first behavior profiling use case, the profile targeting component 505 may perform (1) internal server monitoring, (2) cloud service monitoring, and/or (3) employee virtual private network (VPN) usage monitoring. For instance, for internal server monitoring, the IP address and/or hostname of an internal server that is responsible for storage of critical business or customer data may be provided. Hence the profile targeting component 505 may identify the data source (e.g., a flow of related packets identified by an eflow identifier) and a destination IP address targeted for receipt of the flow of related packets (data_source: eflow identifier and data_filter: destination IP address).

As another illustrative deployment, for cloud service monitoring, the profile targeting component 505 may identify the unique identifier which can be used to filter certain cloud application traffic from eflows. As an illustrative embodiment, exfiltration of data through a cloud-based application, which normally runs on secure socket layer (SSL), may be monitored and filtered so that only data from a particular cloud-based server is made available to the profile generation component 515. For instance, to monitor and collect data associated with the exfiltration of data from network resources through a particular cloud-based file hosting service, the targeted behavior profile may be represented as follows: data_source:appid='file hosting service app' & data_filter: ssl_server_name='file_hosting_service.com'.

As yet another illustrative deployment, for employee VPN usage, the profile targeting component 505 may be configured to monitor the VPN logon and/or logoff behaviors from each user to detect potential policy violation (e.g., credential sharing) or compromise. Therefore, the data source may be set as an active director (AD) log with the filter being selected as the logon and logoff events, which may be represented as data_source: AD_log & data_filter: logon/logoff events.

In behavior profiling, the definition of a profiled entity determines how the filtered input data should be grouped when generating the behavior profile. First, there exists many different schemes to define a "profiled entity". For instance, the entity determination component 510 may be configured to tailor the behavior profile in accordance with monitor data associated with a selected profile entity. The "profiled entity" may represent, but not limited or restricted to the following: (1) a network device associated with a particular user, which is represented by a network address (e.g., source IP address, MAC address, etc.); (2) a user represented by a registered user name; (3) a user group sometimes represented by a particular domain; or (4) a server or server group that may be represented by an IP address, MAC address, hostname, or any combination thereof.

Normally, the attacker only compromises one network device from each user (but can be multiple devices over different users in the organization). Therefore, it is contemplated that a default profiled entity may be set in accordance with a network device for a particular user, which may be represented by a source IP address (source_ip) or a hostname. Alternatively, it is contemplated that a user may own or have access to multiple network devices or servers. Therefore, for insider attacks for example, a preferred setting for the profiled entity may be in accordance with a user name, where different traffic from the same user is grouped together during generation of a behavior profile. This grouping may capture a situation in which the insider steals data from network services using different devices during different times.

In order to monitor usage of insiders in relation to their groups, it is contemplated that the entity determination component 510 may be configured to selectively monitor data in accordance with the same functional group in the organization, e.g., engineering, human resources (HR), accounting, or the like.

Lastly, the server is another type of profiled entity in light of the prevalence of attacks being directed to compromise servers. Hence, the entity determination component 510 may be configured to selectively monitor a particular server or a group of servers. The server (or groups of servers) may be defined by IP address, subnet or hostname.

Referring still to FIG. 5, the profile generation component 515 is configured to receive input data, including network sensor data, which has been selectively filtered and grouped by the profile targeting component 505 and the entity determination component 510. Based on the input data, the profile generation component 515 generates one or more behavioral profiles. For example, for a particular profiled entity (e.g., user), depending on the data source and corresponding filters selected, domains, port numbers, IP addresses, destination country information or other information pertaining to access activities by the profiled entity over a prescribed period of time may be stored. A behavior profile that includes access characteristics (e.g., start times, end times, duration, etc.) and/or aggregated counts of certain access activities (e.g., number of DNS queries, internal file downloads, server logins especially to servers with high-level access controls, etc.) may be performed.

According to one embodiment of the disclosure, a behavior profile is defined by a plurality of features, which may be categorized into multiple feature sets, including but not limited or restricted to time features, payload features, location features etc. Different features can be selected individually or jointly in different use cases. For example, for log-based profiling, time features and location features are more meaningful to define the access behavior; while in server related profiling, payload features (can be combined with time features) are more meaningful to define data transfer behavior.

As an illustrative example, similar features may be grouped into feature sets, and different feature set(s) may be selected for generating behavior profiles for different use cases. Examples of three different types of use cases 520-522 are shown in FIG. 5. It is contemplated that certain feature categories may be configurable by the customer. Examples of different feature sets may include a time feature set, a location feature set, and a payload feature set. It is contemplated that other feature sets may be used in the generation of behavior profiles, depending on different data sources and behavior profiling use cases.

The time feature set includes a plurality of time-based features that are normally used to define the access behavior. These features may include, but are not limited or restricted to the following: (1) first access time of the day; (2) last access time of the day; (3) total number of access each day; (4) total duration of access each day; (5) average duration of each access; (6) standard deviation of duration of all accesses; (7) minimum interval time during consecutive accesses; and/or (8) maximum interval time during consecutive accesses.

The location feature set includes a plurality of location-based features that may also be used to define the access behavior of a monitored profiled entity, i.e., where the entity resides. These location-based features may include, but are not limited or restricted to the following: (1) total number of unique IP addresses; (2) total number of countries/cities; (3) frequency distribution of all unique IP addresses; (4) frequency distribution of all unique countries/cities; (5) the geographic distance between two consecutive accessing locations; and/or (6) the moving speed between two consecutive accessing locations.

The payload feature set includes a plurality of payload-based features that may be used to define data transfer behavior. Examples of these payload-based features may include, but are not limited or restricted to the following: (1) total size of all uploading or downloading sessions; (2) average size of each uploading or downloading session; (3) ratio between uploading and download sessions (PCR); (4) the size distribution of all uploading or downloading sessions; and/or (5) average entropy of uploading or downloading (encryption).

The behavior profile generation logic 400 further comprises a profile timing component 530 that is programmable and sets the frequency of feature extraction. By default, base time window is set as one day, i.e., all the above features are extracted based on the aggregation of daily filtered data. Of course, given the programmability, it is contemplated that the filtered data may be extracted with a greater frequency (e.g., every 8 hours, 4 hours, hourly, etc.) or even lesser frequency (e.g., every two days, bi-weekly, weekly, etc.).

B. Reference Profile Generation Logic

As stated above, the reference profile generation logic 420 is configured to produce, during a training period, one or more reference profiles that correspond to observed behaviors (e.g., access and data transfer activities) by a particular profiled entity (or group of entities) as measured over a prolonged period of time (e.g., 1-2 weeks). These observed behaviors are used as expected behaviors for comparison against the monitored behaviors to determine whether a behavioral profile is anomalous. The reference profile generation logic 420 comprises a baseline training component 550 and a baseline generation component 560.

As further shown in FIG. 5, the baseline training component 550 allows for the setting of a training period, which determines a minimum time window established for the behavior profile generation logic 400 to "learn" the pattern of each profiled entity. The training period may depend on the profiled entity, for example, the default training period of a 'user' based entity may be set at 1~2 weeks because user behaviors can vary from day-to-day during a week. However, the training period of a 'server' based entity may be set for a shorter duration, such as 3 to 5 days for example, as server behavior is expected to be more stable than users.

Behavior profiling aims to detect an abnormal, anomalous change in behavior upon analysis of content associated with activities conducted by a particular profiled entity. This change may be determined based on an analysis of content within selected features associated with a particular behavior to determine whether that behavior is suspicious to require additional analysis. One scheme for determining whether the change is 'abnormal' involves use of a reference profile that maintains the baseline behavior for a particular profiled entity. The baseline generation component 560 is configured, based on the input data received during the training period, to generate reference profiles, which may be periodically or aperiodically updated. The different types of reference profiles for a particular profiled entity may include (i) history-based reference profile, (ii) group-based reference profile, and/or location-based reference profile.

History-based behavior change is the most common behavior profiling case, in which a reference profile of the historical behavior of a certain entity is generated to detect a change of future behavior from the same entity. Group-based behavior change is a use case to detect activity by a user that sufficiently deviates from activities conducted by other users from a particular user group or server group. Stated differently, behavior of peers of the particular entity are monitored over the same period of time and compared to behaviors of a monitored user. Hence, the group-based reference profile corresponds to a reference profile directed to the behavior from all entities belonging to the same group (e.g., HR group or IP subnet group), which allows for detection of an entity in the group that is behaving (i.e., conducting activities) that are abnormal with respect to expected activities for a member of that particular group. This abnormal, anomalous behavior may provide an early warning of a potential insider attack.

Additionally, the location based behavior change is directed to activities by a user that may be outside the enterprise network. For 'insider threat' situations, if the server storing critical data is a cloud-based file sharing system, an attacker may behave differently when accessing the server from the enterprise network or from public network. For example, an attacker may download much more data when accessing a Corporate Box account from a local coffee shop than inside the enterprise, especially where public access traffic does not propagate through any (or as many) corporate defense or monitoring systems. As cloud application public access data may not be available for analysis, both corporate access and public access data from the cloud service provider is logged by the enterprise network. In this case, the entity corporate access behavior is used as the base and detect the abnormal, anomalous behavior from the same entity, especially when repeatedly access to network resource via public access is conducted.

C. Behavior Profiling and Reporting Logic

Referring still to FIG. 5, the behavior profiling and reporting logic 440 comprises profiling and detection component 570 and an alert generation logic 580. Herein, the profiling and detection component 570 is configured to conduct behavior profiling based detection to determine whether monitored behavior is suspicious and more in-depth analysis is needed to determine whether the monitored behavior is associated with a malicious attack. According to one embodiment of the disclosure, the profiling and detection component 570 estimates and assigns a probability to monitored behavior for the particular entity. This probability represents the likelihood of detecting the monitored behavior for the particular entity given the behavior distribution learned from the reference profile (e.g., historical behaviors from the same entity or peer behaviors from the same group).

As a result, a confidence score that identifies a likelihood of the monitored behavior being suspicious is inversely correlated to the probability. Stated differently, a lower probability corresponds to a higher confidence score that represents the behavior is abnormal, which suggests that the monitored behavior is suspicious and may be associated with an insider attack. Since 'behavior' is represented as individual or joint features from the above-identified behavior feature sets, the profiling and detection component 570 calculates the separation (distance) over feature vectors (profiling vs detection). For a single feature case, a Gaussian distribution may be applied and use mean and standard deviation to define the "distance". But for high dimensional feature vectors, the distance calculation may warrant component analysis first which can reduce a high-dimensional feature vector into fewer dimensions while retaining the most important information.

Principle Component Analysis (PCA) is a popular method which uses eigenvalue and eigenvector in covariance matrix to calculate and rank the importance of features. PCA can also be done via Singular Value Decomposition (SVD) on the data matrix. Both approaches compute the orthogonal transform which de-correlates the variables and keeps the ones with the largest variance. Restricted Boltzmann Machine (RBM) is another neural network based approach which can learn a distribution over a large set of high-dimensional feature inputs.

After the decomposition and feature reduction, the next thing is the distance calculation. Mahalanobis Distance is a good choice with PCA and SVD, for example where Mahalanobis distance is used to determine how many standard deviations a monitored behavior may be from a mean value for all (or a large subset) of monitored behaviors. The number of deviations is inversely related to the probability of the monitored behavior being associated with a malicious attach.

The alert generation logic 580 is responsible for generating (i) alerts in response to detection of suspicious behavior and (ii) events where the behavior fails to satisfy a prescribed level of confidence that the behavior is suspicious. The events and alerts are determined based on 'confidence', 'severity', and 'attacking stage' parameters.

The 'confidence' score may be generated by the profiling and detection component 570 as described above. It is noted that the confidence score may take into account a substantial reduced probability of high-risk activities by a profiled entity. For instance, the presence of unexpected access patterns to servers with high-level access controls or access patterns by an HR employee after 9 PM may denote a high-risk activity, which is assigned a low probability and a corresponding high confidence score.

The 'severity' assigned to each type of alert should be defined end user, because each end user may have a difference sense as to the level of severity each user case is assigned. For example, where profiling servers within an enterprise network, the 'severity' score can be defined based on the importance of those servers, where "importance" may be based on the confidentiality of data stored on that particular server. For instance, servers that are configured to store company financial information, personal employee information or new product designs may be assigned a severity score greater than servers that are configured to store less sensitive data.

Lastly, the 'attacking stage' identifies the potential type of attack represented by the particular behavior profiling being conducted. For instance, behavior profiling based on log information (e.g., Active Directory based detection) may be identified as an "internal recon" attack stage. Similarly, behavior profiling based on server-based detection may be identified as an "exfiltration".

Referring now to FIG. 6, an illustrative embodiment of a security appliance employing the security framework 110 is shown, which includes the functionality of the endpoint devices 170, network sensor engines 200, data analysis engines 220, and/or centralized controller 240 along with the behavior profiling service logic 380. Herein, the security appliance 600 may be deployed as a system-on-a chip or as a network device including one or more processors 605 and non-transitory storage medium (memory) 610. Coupled to the processor(s) 605, the memory 610 may be used for storing data, metadata, and programs for execution by the processor(s) 605. The memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 610 may be internal or distributed memory. As shown, the memory 610 may be adapted to store the behavior profiling service logic 380, where its components are deployed as software modules.

The security appliance 600 also may include an audio input/output subsystem 615, which may include a microphone and/or a speaker for receiving voice instructions to be executed by the processor(s) 605, playing audio notifications, or emitting a warning sound in response to a detected suspicious behavior that exceeds a predetermined confidence score. A display controller and display device 620 provides a visual user interface for the user, e.g., GUI elements or windows. The security appliance 600 also may include one or more input or output ("I/O") devices and interfaces 625, which are provided to allow a user to provide input to, receive output from, and otherwise transfer data to and from the system. These I/O devices 625 may include a mouse, keypad, keyboard, a touch panel or a multi-touch input panel, camera, optical scanner, network interface, modem, other known I/O devices or a combination of such I/O devices. The I/O devices and interfaces 625 may also include a connector for a dock or a connector for a USB interface, FireWire, Thunderbolt, Ethernet, etc., to connect the security appliance 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the security appliance 600 with another device, external component, or a network and receive stored instructions, data, tokens, etc. It will be appreciated that one or more buses may be used to interconnect the various components shown in FIG. 6. It will be appreciated that additional components, not shown, may also be part of the security appliance 600, and, in certain embodiments, fewer components than that shown in FIG. 6 may also be used in the security appliance 600.

The techniques shown in the figures can be implemented using code and data stored and executed on one or more electronic devices (e.g., a network device). Such electronic devices store and communicate (internally and/or with other electronic devices over a network) code and data using non-transitory storage medium, or a transitory storage medium. In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device of a given electronic device typically stores code and/or data for execution on the set of one or more processors of that electronic device, including code representative of the behavior profiling service logic 380. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A security appliance, comprising:
   one or more processors; and
   a memory coupled to the one or more processors, the memory includes behavior profiling service logic that, when executed by the one or more processors, (i) creates a behavior profile for a particular entity based on received incoming data, and (ii) determines whether the behavior profile identifies that a malicious attack is being performed by the particular entity based on a comparison of the behavior profile to a reference profile;
   wherein the reference profile represents (a) historical behavior of the particular entity that is monitored over a prescribed period of time or (b) behavior of peers of the particular entity that is monitored over the same period of time;
   wherein the behavior profiling service logic further includes behavior profile generation logic that, when executed by the one or more processors, generates the behavior profile based, at least in part, on a plurality of attributes, the plurality of attributes including (a) a monitored source of the received incoming data and (b) the particular entity whose activities are being monitored; and
   wherein the behavior profile is defined by a plurality of features that are categorized in accordance with a selected feature set being one of a time feature set, a location feature set, and a payload feature set, wherein the location feature set includes a plurality of location-based features that are used to define access behavior by the particular entity, wherein the location-based features includes two or more of: (1) a frequency distribution of all unique geographic areas; (2) the geographic distance between two consecutive accessing locations; and (3) the moving speed between two consecutive accessing locations.

2. The security appliance of claim 1, wherein the behavior profiling service logic is implemented within a data analysis engine and controls monitoring and collection of at least a portion of the incoming data associated with a selected behavior type in order to create one or more behavior profiles.

3. The security appliance of claim 1, wherein the behavior profile defined by the time feature set includes a plurality of time-based features that are used to define access behavior by the particular entity, the plurality of the time-based features includes at least three of (1) a first access time of a day by the particular entity; (2) a last access time of the day by the particular entity; (3) a total number of access each day by the particular entity; (4) a total duration of access each day by the particular entity; (5) average duration of each access by the particular entity; (6) a standard deviation of duration of all accesses; (7) a minimum interval time during consecutive accesses; or (8) a maximum interval time during consecutive accesses.

4. The security appliance of claim 1, wherein the location feature set further includes a plurality of location-based features that are used to define access behavior by the particular entity, the location-based features include two or more of (1) a total number of unique Internet Protocol (IP) addresses; (2) a total number of geographic areas; and (3) a frequency distribution of all unique IP addresses.

5. The security appliance of claim 1, wherein the behavior profile is defined by a payload feature set including a plurality of payload-based features that may be used to define data transfer behavior, the payload-based features includes one or more of (1) a total size of all uploading sessions or downloading sessions; (2) an average size of each uploading session or downloading session; (3) a ratio between a number of uploading sessions and a number of downloading sessions, (4) the size distribution of all uploading or downloading sessions.

6. The security appliance of claim 3, wherein the behavior profile generation logic includes a profile timing component that, when executed by the one or more processors, sets a frequency of feature extraction from the plurality of time-based features.

7. The security appliance of claim 1, wherein the behavior profiling service logic includes reference profile generation logic that, when executed by the one or more processors, generates the reference profile during a prescribed training period.

8. The security appliance of claim 7, wherein the training period is based, at least in part, on a type of particular entity in which a default training period directed to a user is greater in duration than a default training period for a server.

9. The security appliance of claim 1, wherein the behavior profiling service logic includes behavior profiling and reporting logic that, when executed by the one or more processors, conducts a comparison between (i) content associated with each of the plurality of features that collectively form the behavior profile, where the content associated with the features may be gathered during a first prescribed period of time, and (ii) content associated with corresponding features of one or more reference profiles produced by the reference profile generation logic.

10. A computerized method comprising:
    generating, by an electronic device communicatively coupled to a network, a reference profile that represents either a historical behavior of a profiled entity being monitored over a first prescribed period of time or a current behavior from peers of the profiled entity being monitored over the first period of time;
    generating, by the electronic device, a behavior profile for a particular entity based on received incoming data, wherein generating the reference profile includes setting a training window corresponding to the first prescribed period of time used in generating the reference profile, wherein the first prescribed period of time is dependent on the particular entity being profiled, and wherein the first prescribed period of time associated with a default training period directed to a user is greater in duration than the default training period directed to a server; and
    determining whether the behavior profile identifies that a malicious attack is being performed by the particular entity based on a comparison of the behavior profile to the reference profile.

11. The computerized method of claim 10, wherein the determining whether the behavior profile identifies that the malicious attack is being performed by the particular entity is conducted by the electronic device.

12. The computerized method of claim 10, wherein the generating of the behavior profile comprises generates the behavior profile based, at least in part, on a plurality of attributes, the plurality of attributes include (a) a monitored source of the received incoming data and (b) the particular entity whose activities are being monitored.

13. The computerized method of claim 10, wherein the behavior profile is defined by a plurality of time-based features that are used to define access behavior by the particular entity, the plurality of time-based features includes (1) a first access time of a day by the particular entity; (2) a last access time of the day by the particular entity; and (3) a total number of access each day by the particular entity.

14. The computerized method of claim 13, wherein the plurality of time-based features further include (4) a total duration of access each day by the particular entity; and (5) average duration of each access by the particular entity.

15. The computerized method of claim 10, wherein the behavior profile is defined by a plurality of location-based features that are used to define access behavior by the particular entity, the location-based features include a total number of unique Internet Protocol (IP) addresses; and a total number of geographic areas associated with the unique IP addresses.

16. The computerized method of claim 10, wherein the behavior profile is defined by a plurality of payload-based features that may be used to define data transfer behavior, the payload-based features includes (1) a total size of a plurality of uploading sessions or downloading sessions, and (2) an average size of each uploading session or downloading session.

* * * * *